April 9, 1968 P. L. MOTHERSOLE 3,377,569

SYNCHRONIZED DEFLECTION CIRCUIT HAVING IMPROVED INTERLACE CONTROL

Filed Aug. 18, 1965

INVENTOR.
PETER L. MOTHERSOLE
BY
Frank R. Jorfani
AGENT 3,377,569
SYNCHRONIZED DEFLECTION CIRCUIT HAVING IMPROVED INTERLACE CONTROL Peter Leonard Mothersole, Horley, England, assignor to North American Philips Company, Inc., New York, N.Y., a corporation of Delaware Filed Aug. 18, 1965, Ser. No. 480,685
Claims priority, application Great Britain, Aug. 24, 1964, 34,521/64
8 Claims. (Cl. 331—145)

ABSTRACT OF THE DISCLOSURE

A vertical deflection circuit including a switching diode in series with the vertical oscillator in the discharge path of the timing capacitor. The switching diode is arranged to decouple the integrated synchronized signals from the vertical oscillator during the retrace period and also clamps the synchronized signals during a portion of the scan period.

This invention relates to synchronized time-base circuits, and more particularly to an improved interlace control for field time-base circuits in television receivers.

In television field deflection circuits, a problem exists which will be explained with reference to FIGURES 2A–2B of the accompanying drawing. The waveform of FIGURE 2A is a typical combined line and field synchronizing signal in accordance with the 405-line system, and the waveform of FIGURE 2B is a field synchronizing signal derived from the first wave by a conventional integrator circuit.

Figures 2A, 2B, 2C:
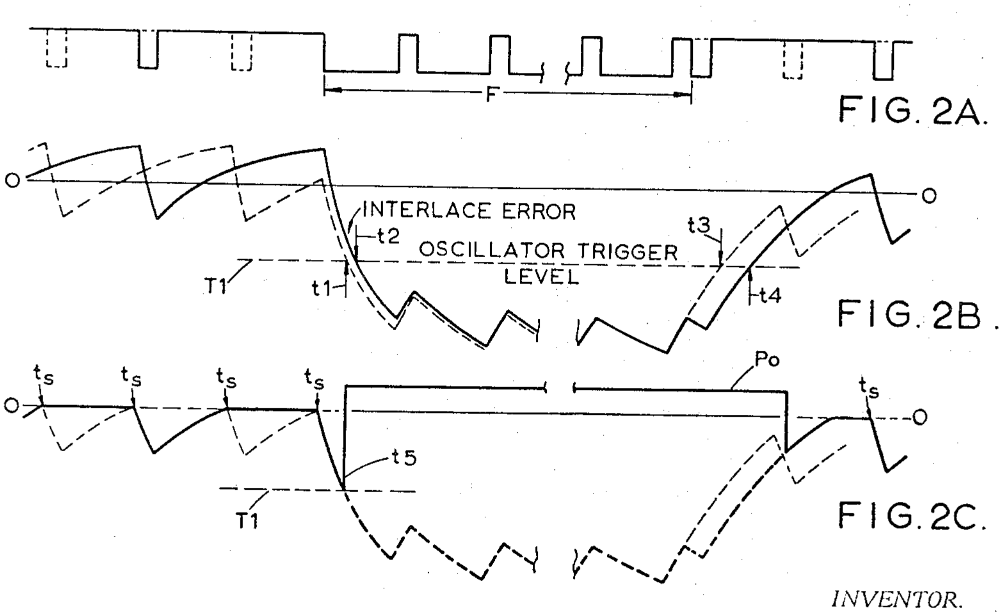

FIGURE 2B shows the leading edge and trigger level T1 at which field synchronization occurs. It is a requirement of the field pulse separator that the said leading edge of the integrated wave should be identical in time on both odd and even frames to secure accurate interlace. With the 405-line system this is difficult since, if a simple integrator is used, there is a small timing error *t*1–*t*2 between the trigger points on the leading edge of the integrated waveform, as shown in FIGURE 2B, which error affects the start of the flyback. In addition there is a larger error *t*3–*t*4 produced at the trailing edge of the integrated waveform which can also influence certain types of oscillator and affect the start of the scan. These facts are well known and a wide variety of circuits have been devised to overcome them but often the circuits are not used because of their cost or complexity.

The present invention provides a field time-base circuit arrangement comprising, in combination, a charge network including a capacitor for supplying a sawtooth stroke drive to an output stage, an oscillator providing a discharge path across said capacitor for periodically discharging the capacitor during flyback periods, a field synchronizing circuit for supplying a synchronizing wave to the oscillator, and switching means for controlling the supply of said synchronizing wave. The switching means are in turn controlled by the oscillator in such manner as to be caused to act whenever the oscillator triggers to initiate a flyback period, such action being to isolate the oscillator from the synchronizing circuit during the flyback period.

The oscillator may employ one or more valves or transistors and may be of the blocking oscillator, multivibrator, or other known type.

As for the switching means, there are advantages in adopting a circuit arrangement wherein the switching means is in series with the discharge path of the oscillator. One such arrangement, employing a diode as the switching means, will be described as a preferred embodiment, and in this arrangement the series connection of the switch in the discharge path enables the discharge current pulse of the oscillator to operate the switch.

This embodiment of the invention will now be described by way of example with reference to FIGURE 1 of the accompanying drawings as applied to a 405-line television receiver circuit in which the field oscillator is of the multivibrator type.

Figure 1:
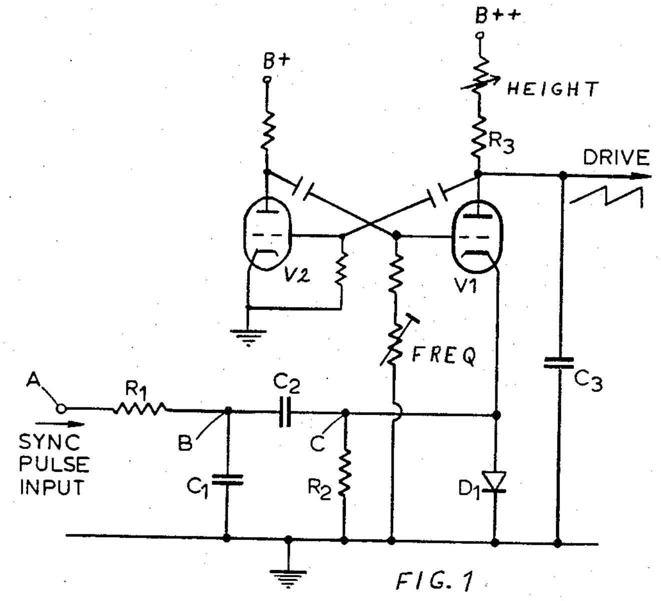

In FIGURE 1 the valve V1 is one of the two valves of the multivibrator and the switching means are shown as a semiconductor diode D1.

Broadly speaking, this arrangement is one wherein the synchronizing circuit comprises an R.C. integrating network followed by a coupling R.C. network the resistance of which is in parallel with the switching diode. As a result of this choice of configuration, the switching diode D1 also acts as a clamp. As will be explained later, this ensures that the starting level of the integrated field pulse is the same for odd and even interlaced fields.

The arrangement will now be described in greater detail.

A sawtooth drive waveform for the field time-base output stage is provided by the multivibrator from the anode of valve V1. The capacitor C3 is charged via load R3 when V1 is off and is discharged by the valve during field flyback periods.

The normal combined line and field synchronizing signal is supplied by a separator circuit (not shown) to the terminal A of the circuit and has the form shown in FIGURE 2A. This waveform is integrated in conventional manner by an integrator circuit R1–C1 to give the field synchronizing signal of FIGURE 2B.

The circuit operates as follows:

The field synchronizing signal is applied to the cathode of the valve V1 instead of the more usual arrangement of applying it to the control grid. The diode D1 is connected in the cathode circuit of the valve V1 and the field synchronizing waveform is A.C.-coupled to the anode of the diode via a network C2–R2.

The diode performs a two-fold action. First, when the valve V1 is cut off (i.e., during periods corresponding substantially to the scanning periods) the diode conducts when the integrated waveform at C tries to go positive. The potential at C is now clamped substantially at zero by the diode. The time constant R2–C2 is chosen so as to ensure that D1 conducts for periods which preferably are approximately equal to half the line scan period. Although this is the preferred duration, the arrangement also works well up to about ¾ of the line scan period, and these two values can conveniently be used for 405 and 625 line systems, respectively, in a dual-standard receiver. This is illustrated in FIGURE 2C (at points *t*S) which shows the waveform which is present at point C in the circuit illustrated, and is due to the presence of the additonal elements C2–R2–D1. The trigger level is T1 and the starting instant is *t*5 for both odd and even fields.

The second action performed by the diode D1 arises as follows. The oscillator is triggered by the negative-going edge reaching level T1 and driving the valve V1 into conduction. When the valve conducts feedback in the oscillator circuit (not shown) drives the grid positive and a pulse of current (FIGURE 2C) flows through the valve which drives the diode hard into conduction for the whole of the oscillator current pulse period P*o*. The currents involved are such that D1 can be regarded effectively as a short-circuit connection. Therefore synchronizing information cannot exist at point C and cannot reach the oscillator since it is effectively by-passed to ground by the diode acting as a very low impedance or short-circuit.

It is normal practice (but not essential with arrangements according to the invention) for the oscillator conduction period P*o* to be longer than that of the field synchronizing pulse R (FIGURE 2A) and this is the case in the present example, as will be seen from a comparison of FIGURES 2A and 2C. In the present case, the timing error *t*3–*t*4 (FIGURE 2B) which would normally be produced at the trailing edge of the integrated synchronizing waveform at the end of period F, now occurs during period P*o* and therefore is rendered ineffective by the diode being held hard in conduction during the whole of the period P*o* so as to have the effect of a short circuit as aforesaid.

A set of practical values and components suitable for use in the circuit of FIGURE 1 is given below by way of illustration.

TABLE

| | |
|---|---|
| Diode D1 | Mullard Type OA70. |
| Resistor R1 | 47K. |
| Resistor R2 | 12–15K. |
| Capacitor C1 | 0.002 μF. |
| Capacitor C2 | 0.01 μF. |

I claim:

1. A vertical deflection system comprising, a network including a capacitor for developing a sawtooth deflection signal for the output stage of said vertical deflection system, an oscillator circuit including amplifier means having first and second electrodes that define a current path, means connecting said amplifier means to said capacitor so that said first and second electrodes provide a discharge path for said capacitor during the retrace periods of said deflection signal, a vertical synchronizing circuit coupled to the input of said oscillator circuit for supplying thereto a synchronizing voltage waveform, and switching means connected in series with said discharge path for controlling the supply of said synchronizing voltage to said oscillator circuit, said switching means being actuated by said oscillator during the retrace periods so as to effectively decouple the oscillator circuit from the synchronizing circuit during said retrace periods.

2. A system as described in claim 1 wherein said switching means comprises a diode in series with said first and second electrodes of the amplifier means.

3. A system as described in claim 1 wherein said synchronizing circuit comprises, an integrating network including a first resistor-capacitor combination coupled to a source of synchronizing signals, an R-C coupling network including a second resistor-capacitor combination coupled to the output of said integrating network wherein said second resistor is connected in parallel with said switching means.

4. A system as described in claim 3 wherein the values of said second resistor-capacitor combination are chosen to produce a time constant for said coupling network that will allow said switching means to conduct for a period of time during the scan period of said vertical deflection system that is approximately equal to one half of said scan period.

5. A vertical deflection system comprising, a vertical oscillator circuit including an amplifier having first and second electrodes that define a current path, means including a capacitor connected in the output of said amplifier for developing a sawtooth deflection signal, said amplifier being connected so that said first and second electrodes provide a discharge path for said capacitor during the retrace period of the deflection signal, unidirectional switching means connected to said first electrode in the input circuit of said amplifier, a vertical synchronizing circuit coupled to said first electrode and to said switching means for supplying to said amplifier input circuit a synchronizing voltage, said switching means being poled to clamp said synchronizing voltage at a given level during a portion of the scan period of said deflection signal, said switching means being actuated by said amplifier during the retrace period so as to effectively decouple the oscillator circuit from the synchronizing circuit during the retrace period.

6. A system as described in claim 5 wherein said amplifier comprises a unidirectionally conductive device and said switching means comprises a diode connected in series therewith with the same polarity.

7. A system as described in claim 6 wherein said diode is connected in series with said amplifier in the discharge path of said capacitor and said synchronizing circuit is coupled in parallel with said diode.

8. A vertical deflection system comprising, a vertical oscillator circuit including an amplifier having first and second electrodes that define a current path, means including a capacitor connected in the output of said amplifier for developing a sawtooth deflection signal, said amplifier being connected so that said first and second electrodes provide a discharge path for said capacitor during the retrace period of the deflection signal, switching means connected between said first electrode and a point of reference potential in the input circuit of said amplifier, a vertical synchronizing circuit coupled to said first electrode and in parallel with said switching means for supplying to said input circuit a synchronizing voltage, said switching means being actuated by said amplifier during the retrace period so as to effectively isolate the oscillator circuit from the synchronizing circuit during the retrace period.

References Cited

UNITED STATES PATENTS

| | | | |
|---|---|---|---|
| 2,744,956 | 8/1956 | Haugen et al. | 178—69.5 |
| 2,833,853 | 5/1958 | Parker | 331—145 X |

ROY LAKE, *Primary Examiner.*

J. B. MULLINS, *Assistant Examiner.*